B. R. LEE.
DEMOUNTABLE RIM.
APPLICATION FILED SEPT. 10, 1917.
1,268,367.
Patented June 4, 1918.
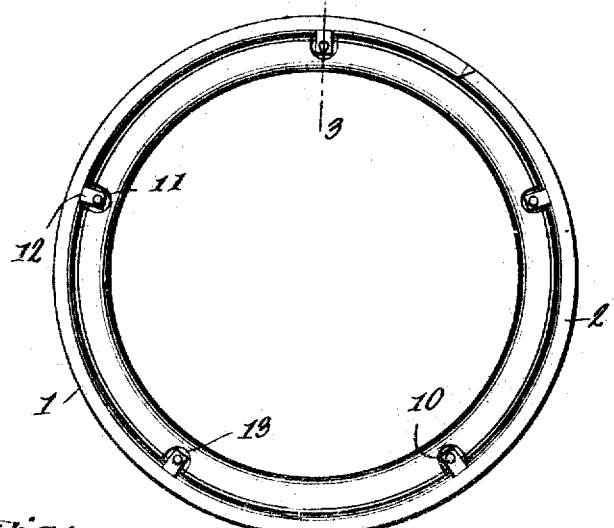
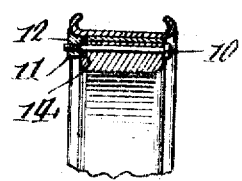
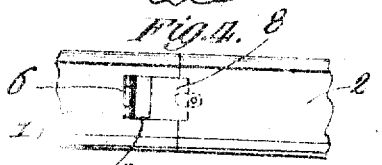
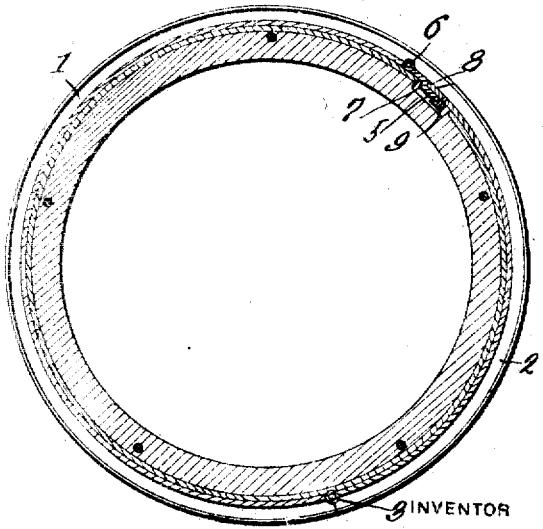
WITNESSES
Guy M. Spring
Lloyd W. Patch
INVENTOR
Benjiman R. Lee
BY Richard Owen
ATTORNEY

UNITED STATES PATENT OFFICE.

BENJIMAN R. LEE, OF CHATTANOOGA, TENNESSEE.

DEMOUNTABLE RIM.

1,268,367.   Specification of Letters Patent.   Patented June 4, 1918.

Application filed September 10, 1917. Serial No. 190,635.

*To all whom it may concern:*

Be it known that I, BENJIMAN R. LEE, a citizen of the United States, residing at Chattanooga, in the county of Hamilton and State of Tennessee, have invented certain new and useful Improvements in Demountable Rims, of which the following is a specification.

This invention relates to an improvement in demountable rims such as are used for mounting pneumatic tires upon automobile wheels and the like, and it is a purpose of my invention to provide a rim structure which is not only split, as is customary, but which is made up in two sections hingedly connected together and thus so arranged that a tire casing can be fitted in place upon and removed from the rim, with greater facility.

A further object resides in constructing a rim expanding and connecting means which will force the rim sections into the proper position with respect to the casing, and will rigidly connect the loose ends of the rim to present the same substantially as a continuous ring.

Yet another object lies in providing means by which the rim is held upon a wheel, and which means is so constructed that it can be expeditiously adjusted for securement or release of the rim.

With the above and other objects in view, which will be in part described and in part understood from the specification, drawings, and claim, my invention consists in certain novel features of construction and combination of parts which will be hereinafter more fully set forth.

In the drawings:—

Figure 1 is a view in elevation showing the rim structure fitted in place on a felly.

Fig. 2 is a sectional view to show the manner of forming the rim structure and the means for fastening the ends.

Fig. 3 is a fragmentary sectional view taken on the line 3—3 of Fig. 1.

Fig. 4 is a fragmentary elevational view showing the arrangement of the parts of the fastening when viewed from that side on which the tire is fitted, and Fig. 5 is a fragmentary sectional view to better show the locking or fastening means.

The rim comprises the two sections 1 and 2, which are hinged together at 3, the member 2, which comprises substantially one third of the total extent of the ring, being thus so mounted that it will swing within the member 1. With the parts hingedly mounted in the manner as set forth, when the member 2 is swung to have its free end embraced within the lines of the member 1, the rim structure as an entirety can be lifted from a casing to which it has been fitted and on the other hand, when the section 2 is swung out to complete the circular lines of the rim and to have the free end thereof abutting against the free end of the member 1, the rim sections will be held in this position by the binding force exerted by the casing, however, it is desirable that some means be provided for positively locking and securing the abutting ends of the members 1 and 2 together, and to act to force the same into place as well as release the end.

With this purpose in view, the body portion of the member 1 is cut away at the free end substantially as is shown at 4, and a securing member 5 is hingedly mounted at 6, so that it will swing within the opening formed by cutting away the member 1. This securing member is offset as indicated at 7, and the member 2 has the end 8 of the body thereof formed to abut against this offset at 7, when the parts are brought to the relation shown in Fig. 2, in such a way that the end of the securing member 5 lies against the inner side of the body of the member 2. A locking member 9, which is made substantially in the form of a turn button, is mounted upon the member 2 and is so disposed that it can be turned to engage over the end of the securing member 5 and to fixedly hold the same against movement from that position in which it bears against the inner side of the member 2.

With parts arranged as is above set forth, when it is desired to fit the rim within a casing which is to be mounted thereon, the member 2 is swung to have the free end thereof within the member 1, and this member 1 is fitted to the casing following which the member 2 is swung out and the securing member 5 is moved up to bring the offset 7 thereof against the end 8 of the member 2, following which the securing member is pried or forced up to rest against the inner side of the member 2 and to carry the free end of this member up to the proper alined relation with respect to the free end of the member 1, following which the locking member 9 is turned to engage over the end of the securing member 5 and the parts are thus locked and secured in the assembled relation. The binding force of the tire against the rim portion will of course act to hold the sections 1 and 2 of the rim against spreading outwardly, and when it is desired to again remove the casing, a hammer or other suitable instrument is used to turn the locking member 9 to disengage the same from the securing member 5, following which this member 5 is pried down to move the same from the bearing engagement against the inner side of the member 2, which operation causes the member 2 to be carried and swung therewith so that the abutting ends of the two members are disalined. When the locking and securing parts have been released, it will of course be understood that the member 2 can be then swung to be disengaged from the casing, and then the member 1 can be readily lifted from its fitted position within the casing.

To provide for holding and securing the rim in place upon the wheel, bolts 10 are passed through the felly to have their screw-threaded ends extended, the nuts 11 being mounted on the screw threaded ends. It is preferable that the threads of the bolts 10 and the nuts 11 be made of a reasonably steep pitch, for reasons which will be better hereinafter set forth, and the nuts 11 have extensions 12 at one side thereof shaped on their inner faces to conform substantially to the side edge of the rim. In some instances it may be found desirable to provide spaces within the felly in which the nuts 11 are to work, and this is done by cutting out the same, this recess forming a socket for the reception of a locking washer 13, or other suitable means by which the nuts 11 will be held against casual turning or loosening on the bolts. Where the parts are fitted as is shown in Fig. 1, and the nuts 11 are turned to such position that the extensions 12 thereof rest against and secure the rim structure in place, the rim can be removed by giving each of the nuts 11 a half turn so that they will be loosed upon the bolts 10, and at the same time the extensions 12 will be readjusted to such position that they clear the rim member, and thus the rim, having a tire thereon, can be removed. When the rim is to be again secured in place, after having been fitted upon the wheel, the nuts 11 are turned in a direction to tighten the same, and when a half turn of these nuts has been accomplished, are brought to such relations that the extensions 12 thereof overlie and bear against the rim sections 1 and 2, in which relation the rim portion as an entirety is secured and substantially clamped in place upon the wheel felly.

From the foregoing it will be seen that I have provided a demountable rim structure which is of such character that it can be readily fitted to and removed from a casing, and when brought to the fitted position will have the ends thereof locked and forcibly secured together; and also, it will be noted that a very efficient fastening is provided to hold the rim in place upon a wheel.

While I have herein shown and described only certain specific forms and arrangements of the parts, it will be appreciated that changes and variations may be resorted to, in view of which fact I wish to be limited to only such points as may be set forth in the claim.

I claim:—

A demountable rim including a pair of rim members hingedly connected together and so shaped that when fitted to a casing the ends thereof will be brought to an abutting relation, one of said rim members being cut out in the body portion at the free end, and a securing member having an offset therein mounted within the opening formed by cutting out the rim member and so shaped that when the free end of the remaining rim member is caught within the offset thereof and this securing member is swung to be received in the cut out of the first mentioned rim member and lie in line with the body thereof the end of the rim member caught by the offset will be lined up and brought into an abutting relation with the rim member having the securing member carried thereby.

In testimony whereof I affix my signature in presence of two witnesses.

BENJIMAN R. LEE.

Witnesses:
 JAMES P. SANDERS,
 JAMES C. SANDERS.